United States Patent
Taoka

(10) Patent No.: US 11,381,795 B2
(45) Date of Patent: *Jul. 5, 2022

(54) IMAGE PROCESSING APPARATUS CONFIGURED TO CORRECT A LUMINANCE VALUE OF A TARGET PIXEL, IMAGING APPARATUS, IMAGE PROCESSING METHOD, AND IMAGE PROCESSING PROGRAM

(71) Applicant: Samsung Electronics Co., Ltd., Suwon-si (KR)

(72) Inventor: Mineki Taoka, Yokohama (JP)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/007,169

(22) Filed: Aug. 31, 2020

(65) Prior Publication Data

US 2020/0396433 A1    Dec. 17, 2020

Related U.S. Application Data

(63) Continuation of application No. 16/659,065, filed on Oct. 21, 2019, now Pat. No. 10,812,765.

(30) Foreign Application Priority Data

Oct. 29, 2018 (JP) .............................. JP2018-202927

(51) Int. Cl.
*H04N 7/18* (2006.01)
*H04N 9/64* (2006.01)
*H04N 5/33* (2006.01)

(52) U.S. Cl.
CPC ............. *H04N 9/646* (2013.01); *H04N 5/332* (2013.01)

(58) Field of Classification Search
CPC .... H04N 9/646; H04N 5/332; H04N 9/04553; H04N 9/04563; H04N 5/2355; H04N 5/235; H04N 5/379
(Continued)

(56) References Cited

U.S. PATENT DOCUMENTS 7,349,574 B1 * 3/2008 Sodini .................. G06T 5/40
                                                   348/E5.037
8,467,088 B2   6/2013 Hosaka
(Continued)

FOREIGN PATENT DOCUMENTS

CN    106296624 A    1/2017
CN    107967668 A    4/2018
(Continued)

OTHER PUBLICATIONS

Mihoubi et al, Multispectral demosaicing using intensity in edge sensing and iterative difference based methods (Year: 2016).

*Primary Examiner* — Shan E Elahi
(74) *Attorney, Agent, or Firm* — Harness, Dickey & Pierce, PLC

(57) ABSTRACT

An image processing apparatus including a processor is provided. The processor inputs, from an imaging element in which first imaging pixels having a lower SNR and second imaging pixels having a higher SNR are arranged on a same layer, a first captured image by the first imaging pixels and a second captured image by the second imaging pixels when the first imaging pixels and the second imaging pixels perform imaging simultaneously, selects a target pixel from the first captured image, extracts, from the second captured image or an interpolated image of the second captured image, pixels having luminance values close to a luminance value of a pixel corresponding to the target pixel in the second captured image or interpolated image, selects pixels corresponding to the extracted pixels from the first captured
(Continued)

image, and corrects a luminance value of the target pixel based on luminance values of the selected pixels.

20 Claims, 14 Drawing Sheets

(58) Field of Classification Search
USPC .......................................................... 348/164
See application file for complete search history.

(56) References Cited

U.S. PATENT DOCUMENTS

| | | |
|---|---|---|
| 9,171,355 B2 | 10/2015 | Zhuo et al. |
| 9,191,593 B2 | 11/2015 | Hosaka |
| 9,501,683 B1 * | 11/2016 | Hatstat ................. G06K 7/1465 |
| 10,764,507 B1 * | 9/2020 | Li ....................... H04N 9/04515 |
| 2006/0222260 A1 * | 10/2006 | Sambongi ............... G06T 5/006 |
| | | 382/274 |
| 2010/0149359 A1 | 6/2010 | Taoka |
| 2015/0172618 A1 | 6/2015 | Takahashi et al. |
| 2016/0335778 A1 | 11/2016 | Smits |
| 2017/0195589 A1 * | 7/2017 | Kovacovsky ........ H04N 5/2352 |
| 2017/0230594 A1 * | 8/2017 | Ono ....................... G02B 17/08 |
| 2018/0130189 A1 | 5/2018 | Kaneko |
| 2018/0330160 A1 | 11/2018 | Yamamoto et al. |

FOREIGN PATENT DOCUMENTS

| | | |
|---|---|---|
| JP | 4501855 B2 | 7/2010 |
| JP | 2017-097645 A | 6/2017 |
| KR | 101547984 B1 | 8/2015 |
| KR | 20150140380 A | 12/2015 |
| WO | WO-2017-090454 A1 | 6/2017 |

* cited by examiner

FIG. 4
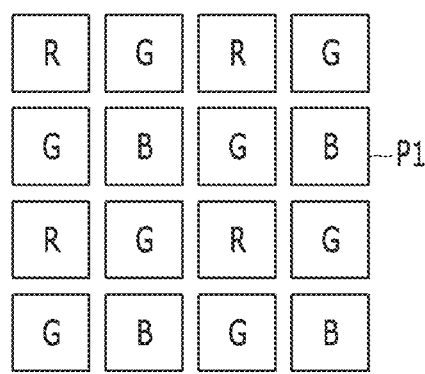
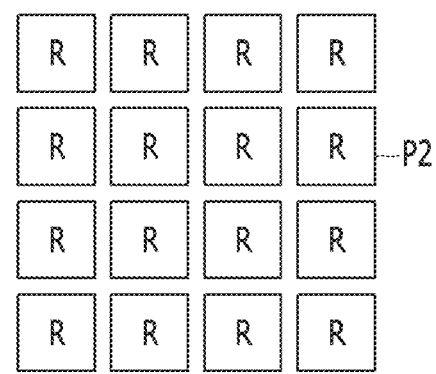
Captured image                Interpolated image

FIG. 7

FIG. 10
First and second embodiments
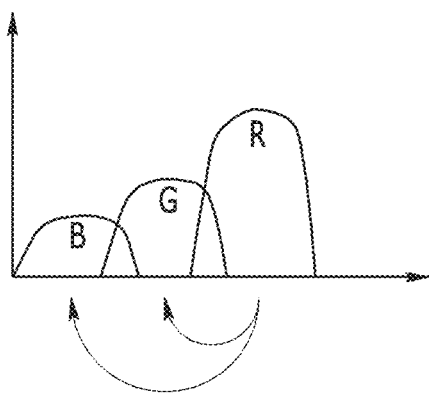
Third embodiment
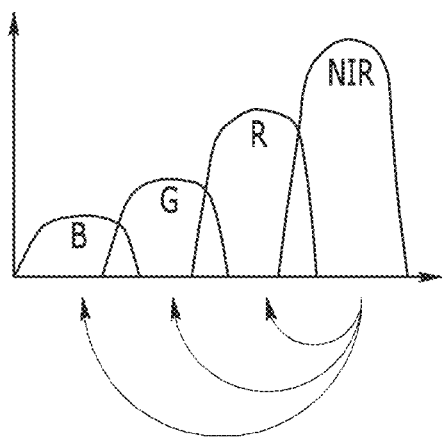

FIG. 14

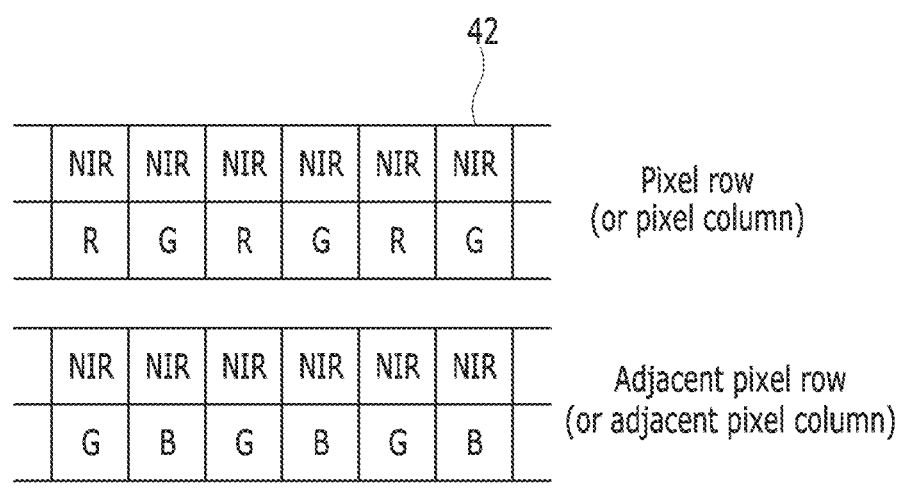

|     |     |     |     |     |     |
|-----|-----|-----|-----|-----|-----|
| NIR | NIR | NIR | NIR | NIR | NIR |
| R   | G   | R   | G   | R   | G   |

Pixel row (or pixel column)

|     |     |     |     |     |     |
|-----|-----|-----|-----|-----|-----|
| NIR | NIR | NIR | NIR | NIR | NIR |
| G   | B   | G   | B   | G   | B   |

Adjacent pixel row (or adjacent pixel column)

IMAGE PROCESSING APPARATUS CONFIGURED TO CORRECT A LUMINANCE VALUE OF A TARGET PIXEL, IMAGING APPARATUS, IMAGE PROCESSING METHOD, AND IMAGE PROCESSING PROGRAM

CROSS-REFERENCE TO RELATED APPLICATIONS

This application is a Continuation of U.S. application Ser. No. 16/659,065, filed on Oct. 21, 2019, which claims priority to and the benefit of Japanese Patent Application No. 2018-202927 filed in the Japan Patent Office on Oct. 29, 2018, the entire contents of which are incorporated herein by reference.

BACKGROUND

(a) Field

The described technology generally relates to an image processing apparatus, an imaging apparatus, an image processing method, and/or a non-transitory computer readable medium storing an image processing program.

(b) Description of the Related Art

An imaging apparatus such as a digital camera or a smartphone may perform imaging in a dark scene. For example, an information processing apparatus such as the smartphone, may capture an infrared light image and a visible light image, recognize a face image from the infrared light image, extract an image for each part from the face image, correct the image for each part using the visible light image and the infrared light image in accordance with the extracted part, and combine the corrected part images to reconstruct the image.

In the imaging apparatus, there is a great demand for high sensitivity due to a demand for natural imaging without using a flash in the dark scene. However, considering the performance of the imaging apparatus, it is desirable to remove noise when perform imaging with increased sensitivity in the dark.

SUMMARY

An example embodiment provides an image processing apparatus, an imaging apparatus, an image processing method, and/or a non-transitory computer readable medium storing an image processing program, for acquiring an image excellent in color reproducibility and color resolution by appropriately removing noise from a noisy image captured in the dark.

According to an example embodiment, an image processing apparatus may include processing circuitry configured to, receive a first captured image and a second captured image simultaneously captured via first imaging pixels and second imaging pixels, respectively, that are one of stacked or are arranged on a same layer of an imaging element, the second imaging pixels having a higher signal-to-noise ratio (SNR) than the first imaging pixels, select a target pixel from the first captured image, the target pixel in the first captured image having a corresponding pixel in the second captured image or an interpolated image of the second captured image, extract pixels from the second captured image or the interpolated image of the second captured image to generate extracted pixels such that first luminance values of the extracted pixels are close to a second luminance value of the corresponding pixel, select pixels corresponding to the extracted pixels from the first captured image as selected pixels, and correct a luminance value of the target pixel based on luminance values of the selected pixels.

According to another example embodiment, an image processing method may include receiving a first captured image and a second captured image captured simultaneously via first imaging pixels and second imaging pixels, respectively, stacked or are arranged on a same layer of an imaging element, the second imaging pixels having a higher signal-to-noise ratio (SNR) than the first imaging pixels; selecting a target pixel from the first captured image, the target pixel in the first captured image having a corresponding pixel corresponding in the second captured image or an interpolated image of the second captured image; extracting pixels from the second captured image or the interpolated image of the second captured image to generate extracted pixels such that first luminance values of the extracted pixels are close to a second luminance value of the corresponding pixel; selecting pixels corresponding to the extracted pixels from the first captured image as selected pixels; and correcting a luminance value of the target pixel based on luminance values of the selected pixels.

According to yet another example embodiment, a non-transitory computer readable medium may store an image processing program that, when executed by a computing device, configures the computing device to receive a first captured image and a second captured image by simultaneously captured via first imaging pixels and second imaging pixels, respectively, that are one of stacked or are arranged on a same layer of an imaging element, the second imaging pixels having a higher signal-to-noise ratio (SNR) than the first imaging pixels; select a target pixel from the first captured image, the target pixel in the first captured image having a corresponding pixel corresponding thereto in the second captured image or an interpolated image of the second captured image; extract pixels from the second captured image or the interpolated image of the second captured image to generate extracted pixels such that the first luminance values of the extracted pixels are close to a second luminance value of the corresponding pixel; selecting pixels corresponding to the extracted pixels from the first captured image as selected pixels; and correct a luminance value of the target pixel based on luminance values of the selected pixels.

BRIEF DESCRIPTION OF THE DRAWINGS

FIG. 4 is a diagram for explaining interpolation processing according to a first example embodiment.

FIG. 7 is an example of a noise-removed image according to a first example embodiment and a comparative example.

FIG. 10 is a diagram for schematically explaining an image processing method according to a third embodiment.

FIG. 14 is a diagram for explaining a schematic configuration of an imaging element according to a modification of a third example embodiment.

DETAILED DESCRIPTION

Figure 1:
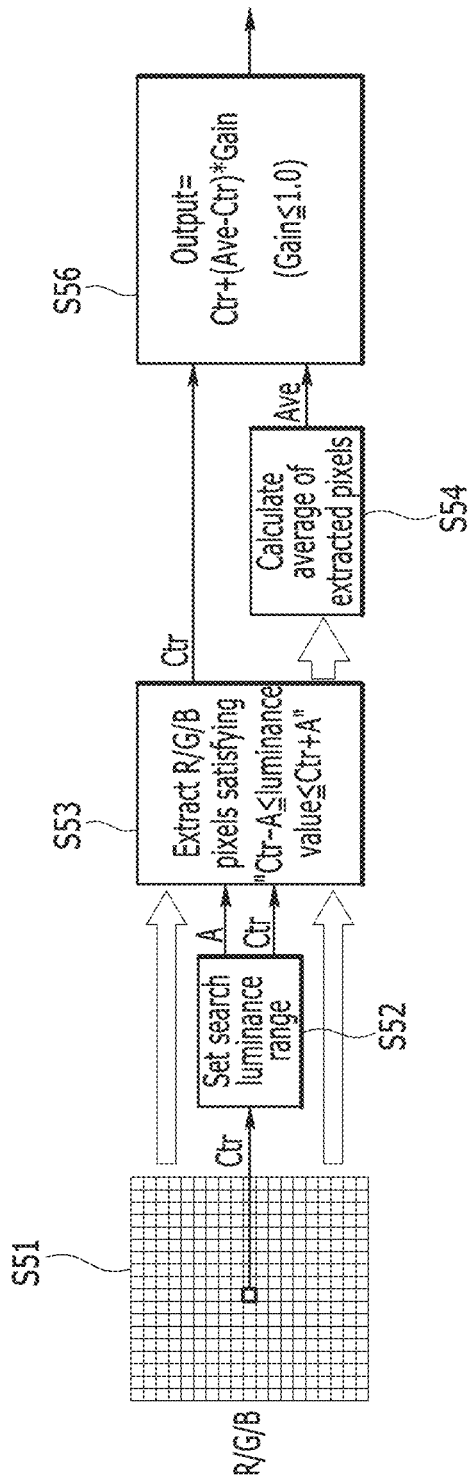
FIG. 1 is a diagram for explaining an image processing method according to a comparative example.

In the following detailed description, only certain example embodiments have been shown and described, simply by way of illustration. As those skilled in the art would realize, the described example embodiments may be modified in various different ways, all without departing from the spirit or scope thereof. Accordingly, the drawings and description are to be regarded as illustrative in nature and not restrictive. Like reference numerals designate like elements throughout the specification.

Hereinafter, an image processing apparatus and an image processing method according to example embodiments are described. Before describing the example embodiments, as a comparative example, an image processing method of removing noise by correcting a luminance value of a target pixel using luminance values of peripheral pixels is described.

Comparative Example

FIG. 1 is a diagram for explaining an image processing method according to a comparative example.

In an imaging element, imaging pixels including photoelectric conversion units, which perform imaging in a red wavelength band, a green wavelength band and a blue wavelength band (hereinafter referred to as "R imaging pixel", "G imaging pixel" and "B imaging pixel", respectively) are, for example, regularly arranged like a Bayer array. The image processing method shown in FIG. 1 sequentially select a pixel from which noise is to be removed (hereinafter referred to as "target pixel") in an image captured by the imaging element and corrects the target pixel.

In operation S51, the image processing method selects the target pixel from the captured image.

Next, in operation S52, the image processing method sets a luminance range ±A determined by a magnitude of a luminance value (signal value) Ctr of the target pixel. For example, if the luminance value Ctr is small, the luminance range ±A is set to be narrow. If the luminance value Ctr is great, the luminance range ±A is set to be wide.

Next, in operation S53, the image processing method searches for and extracts pixels whose luminance values fall within a range of the following Equation 1 from pixels around the target pixel (hereinafter referred to as "peripheral pixels"). For example, if the target pixel is a pixel imaged in the red wavelength band (hereinafter referred to as an "R pixel"), the image processing method searches for and extracts R pixels whose luminance values fall within a range of the following Equation 1 from pixels such as ±8 pixels or ±10 pixels in vertical and horizontal directions around the target pixel (hereinafter referred to as "peripheral pixels"). As a result, pixels similar to the target pixel can be extracted. Hereinafter, a pixel imaged in the green wavelength band and blue wavelength band are also referred to as "G pixel" and "B pixel", respectively.

$$\text{Ctr} - A \leq \text{luminance values of peripheral pixels} \leq \text{Ctr} + A \quad \text{Equation 1}$$

In operation S54, the image processing method then calculates an average value Ave of the luminance values of the extracted R pixels, and, in operation S55, calculates an output value Output using the following equation 2, and replaces the luminance value Ctr of the target pixel with the output value Output thereby removing the noise of the target pixel.

$$\text{Output} = \text{Ctr} + (\text{Ave} - \text{Ctr}) \times \text{gain} \quad \text{Equation 2}$$

Here, gain≤1.0

In general, although the most effective way to reduce noise of an image is to use an average value of a plurality of pixels as a value of the target pixel, if the average value of peripheral pixels is simply used, the image itself becomes blurred. Therefore, as described above, the method of searching for the pixels similar to the target pixel based on features such as an edge and a gradient, that is, the method of searching for a region having the same color and luminance distribution and using pixels in the region is performed. However, when searching for the pixels similar to the target pixel, a ratio of noise to a signal increases in a scene where the noise is most desired to be removed, for example, in a dark scene so that it is difficult to distinguish the pixel similar to the target pixel and the pixel that is not similar to the target pixel.

In the image processing method of the comparative example described above, the pixel search for calculating the average value Ave is performed on pixels having the same color as the target pixel. This works well for pixels with high signal intensity, that is, pixels with a somewhat high SNR (signal-to-noise ratio) (for example, R pixels in the dark or in a dark area). Therefore, the image processing method can search for pixels in the similar region like searching for the same edge portion when the target pixel is the edge portion and searching for the same background portion when the target pixel is the background portion.

However, in pixels with a low SNR (for example, G pixels and B pixels in the dark or in the dark area), the signal is buried by the noise so that it is difficult to search for pixels in the similar region and noise removal performance is reduced. As a result, there is a trade-off between (1) a situation where a corrected image becomes blurred when a luminance range ±A is widened to increase the noise removal effect and (2) a situation where the noise removal effect decreases when the luminance range ±A is narrowed to prevent the corrected image from being blurred. Therefore, the image can be blurred or the noise cannot be sufficiently reduced in the part where the noise is desired to be reduced.

Therefore, an image processing apparatus and an image processing method according to various example embodiments, which can acquire an image excellent in color reproducibility and color resolution by appropriately removing noise from a noisy image captured in the dark, will be described below.

First Embodiment

An image processing apparatus and an image processing method according to a first example embodiment remove noise from an image captured by an imaging element in which RGB imaging pixels are arranged on the same layer. In this case, the first example embodiment selects a G pixel or B pixel having a low SNR in the dark or in a dark part as a target pixel, extracts peripheral R pixels based on a luminance value of an R pixel corresponding to the target pixel and having a high SNR in the dark or in the dark part, selects G pixels or B pixels corresponding to the extracted R pixels, and corrects the target pixel based on luminance values of the selected G pixels or B pixels.

Hereinafter, the image processing apparatus and the image processing method according to the first embodiment are described with reference to the drawings.

First, a configuration of an image processing apparatus according to the first example embodiment is described.

The image processing apparatus according to the first example embodiment is an imaging apparatus, and particularly functions as an image processing unit and removes the noise from the captured image.

Figure 2:
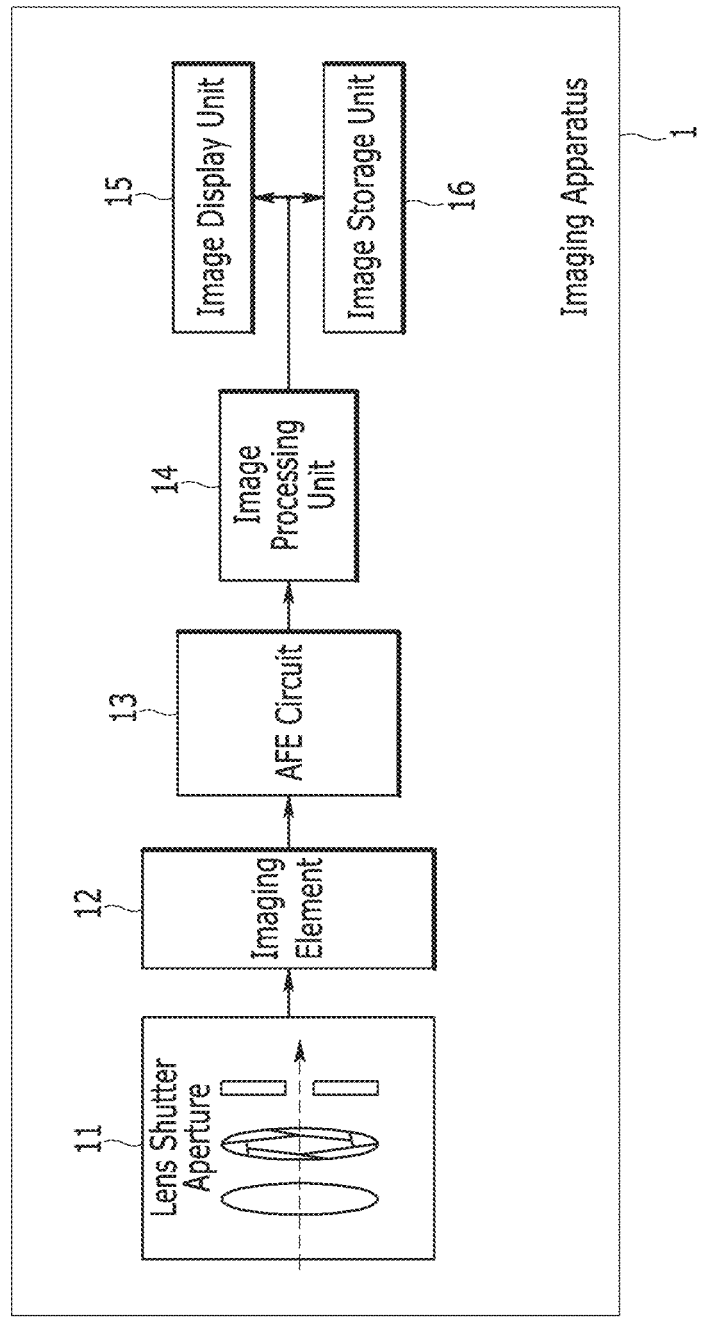
FIG. 2 is a block diagram showing a schematic configuration of an imaging apparatus 1 according to a first example embodiment.

FIG. 2 is a block diagram showing a schematic configuration of an imaging apparatus 1 according to the first example embodiment.

Referring to FIG. 2, the imaging apparatus 1 is, for example, a digital camera, and includes a lens optical system 11, an imaging element 12, an analog front end (AFE) circuit 13, an image processing unit 14, an image display unit 15, and an image storage unit 16.

The lens optical system 11 includes a lens, an aperture, and a shutter, and forms a subject image on an imaging surface of the imaging element 12.

The imaging element 12 is an image sensor such as a charged coupled device (CCD) or a complementary metal oxide semiconductor (CMOS), and photoelectrically converts the subject image to generate and output an image signal (RGB color signal) of the captured image. In the imaging element 12, RGB imaging pixels may be arranged in a Bayer array on a same layer.

The AFE circuit 13 performs A/D (analog to digital) conversion on an analog image signal that is output from the imaging element 12 and then subjected to signal processing by a CDS circuit (not shown), and outputs a digital image signal to the image processing unit 14.

The image processing unit 14 calculates R signals at a G pixel position and a B pixel position of the captured image by interpolation, and generates R signals for all the pixels.

Further, the image processing unit 14 sequentially selects the G pixel or the B pixel as a target pixel, extracts peripheral R pixels whose luminance values are close to a luminance value of an R pixel corresponding to the target pixel, selects G pixels or B pixels corresponding to the extracted R pixels and corrects the target pixel based on luminance values of the selected G pixels or B pixels.

Details of the processing of the image processing unit 14 will be described later.

The image display unit 15 displays the captured image from which noise has been removed, and the image recording unit 16 stores the captured image from which noise has been removed.

Each component realized by the image processing unit 14 may be realized, for example, by executing a program under a control of a processor (not shown) provided in the image processing unit 14 that is a computer. For example, in some example embodiments, the image processing unit 14 may be implemented using processing circuitry such as hardware including logic circuits, a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a System-on-Chip (SoC) a programmable logic unit, a microprocessor, or an application-specific integrated circuit (ASIC), etc. The processing circuitry may be configured as a special purpose computer to select a target pixel (e.g., a G or B pixel) from a first captured image having a relatively low signal-to-noise ratio (SNR), extract peripheral pixels (e.g., R pixels) from a second captured image or an interpolated version thereof having a relatively high SNR, select pixels (e.g., G or B) corresponding to the extracted pixels from the first captured image having the low SNR, and correct a luminance value of the target pixel (e.g., the G or B pixel) in the first captured image based on luminance values of the selected pixels (e.g., G or B). Therefore, the processing circuitry can acquire an image excellent in color reproducibility and color resolution by appropriately removing noise from a noisy image captured in the dark.

More specifically, the image processing unit 14 may be realized by loading a program stored in a storage device (not shown) into a main memory (not shown) and executing the program under the control of the processor. The processor may be, for example, a processing unit such as a graphic processing unit (GPU), a central processing unit (CPU), a microprocessor unit (MPU), or a micro controller unit (MCU). Each component is not limited to being realized by software by a program, and may be realized by any combination of hardware, firmware, and software.

The above-described program may be supplied to the image processing unit 14 with being stored in various types of non-transitory computer readable media. The non-transitory computer readable media include various types of tangible storage media.

Examples of the non-transitory computer-readable media include a magnetic recording medium (for example, a flexible disk, a magnetic tape, or a hard disk drive), a magneto-optical recording medium (for example, a magneto-optical disk), a CD-ROM (Read Only Memory), a CD-R, a CD-R/W, and a semiconductor memory (for example, a mask ROM, a PROM (Programmable ROM), an EPROM (Erasable PROM), a flash ROM, or a RAM (random access memory)).

Further, the program may be supplied to the image processing unit 14 by various types of temporary computer readable media. Examples of the transitory computer readable media include an electrical signal, an optical signal, and an electromagnetic wave. The temporary computer-readable media may supply the program to the image processing unit 14 via a wired communication path such as an electric wire or an optical fiber, or a wireless communication path.

Next, an operation, i.e., an image processing method of the imaging apparatus 1 according to the first example embodiment is described.

Figure 3:
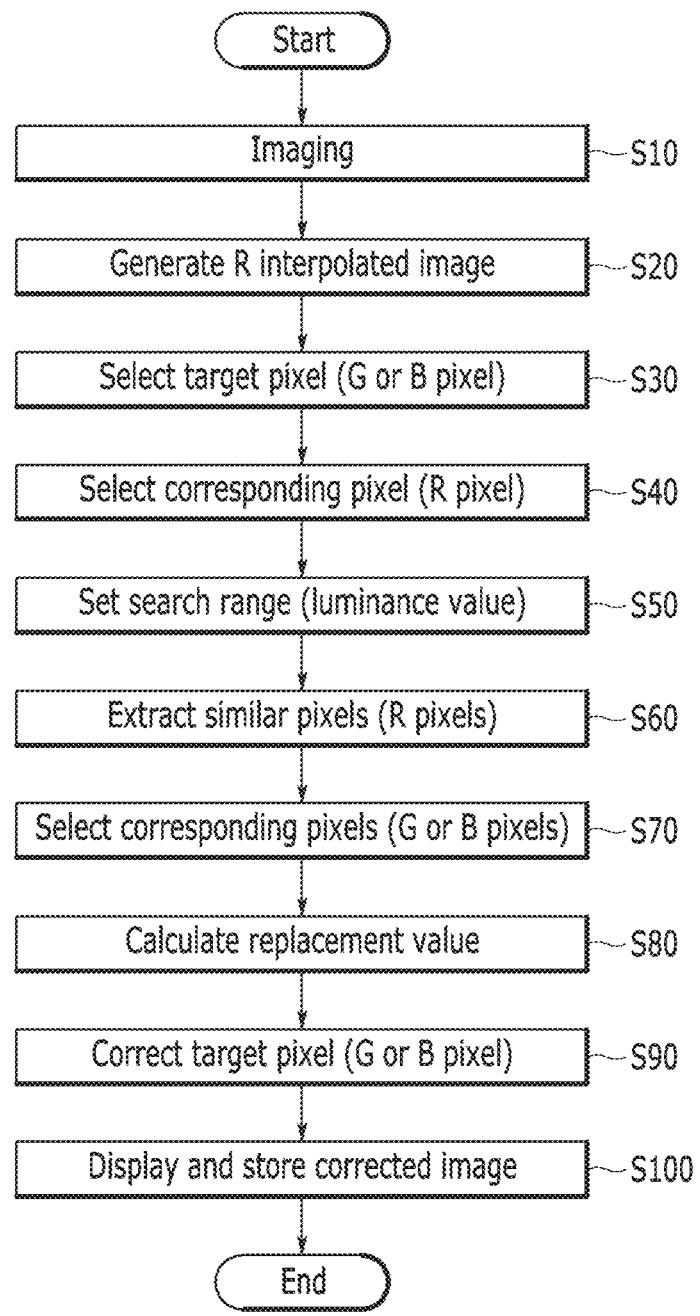
FIG. 3 is a flowchart showing an image processing method according to a first example embodiment.

FIG. 3 is a flowchart showing an image processing method according to the first example embodiment.

In operation S10, when a shutter of an imaging apparatus 1 is pressed, an imaging element 12 captures an image. Then, in operation S20, an image processing unit 14 calculates an R signal at a G pixel position and a B pixel position of a captured image by interpolation processing using peripheral R pixels, and generates an R interpolated image in which all pixels are R pixels.

FIG. 4 is a diagram for explaining interpolation processing according to the first example embodiment. In FIG. 4, a left figure shows an enlarged part of the captured image, and RGB pixels are arranged in the Bayer array. A right figure shows an enlarged part of the R interpolated image, and G pixels and B pixels of the captured image are replaced with R pixels so that all the pixels are R pixels.

In this specification, pixels at the same position (coordinates) in two images are expressed as "corresponding to" each other. For example, in FIG. 4, a B pixel P1 of the captured image and an R pixel P2 of the interpolated image are expressed as "corresponding to" as long as they are at the same position.

Figure 5:
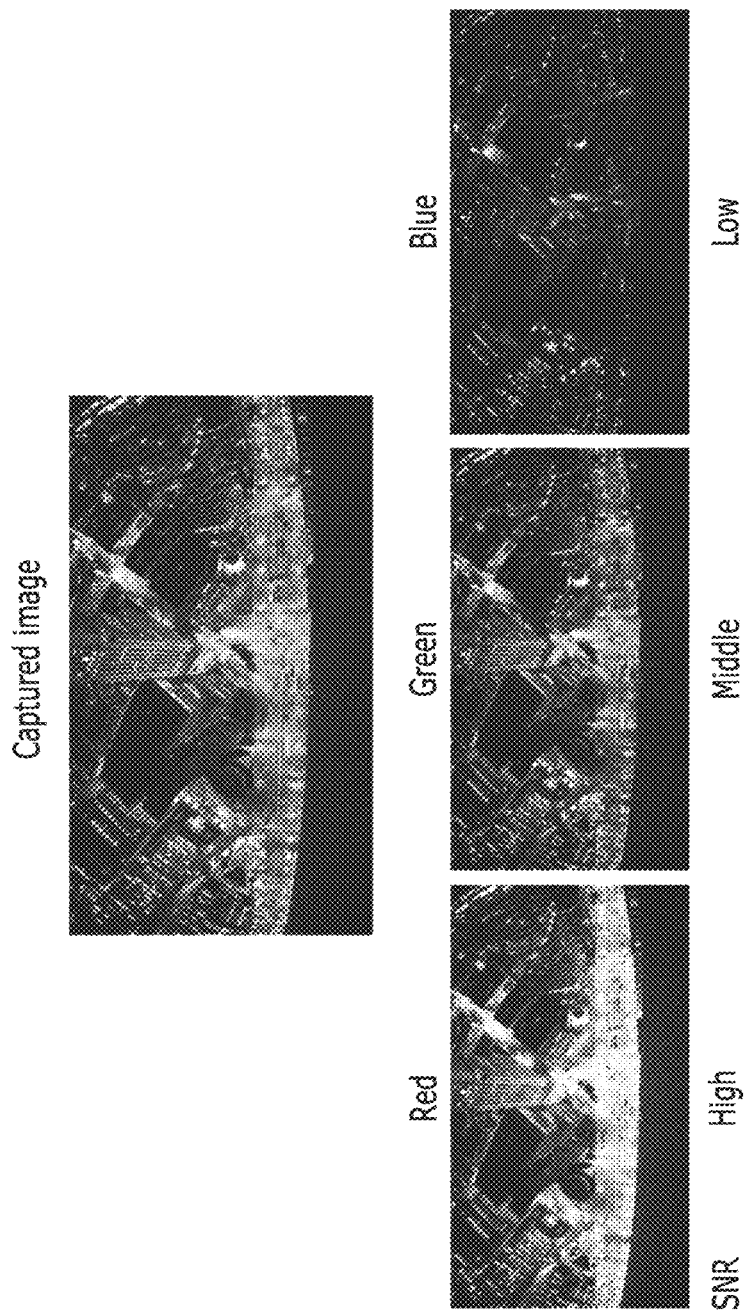
FIG. 5 is an example of a captured image and its interpolated image according to a first example embodiment.

FIG. 5 is an example of a captured image and its interpolated image according to the first example embodiment. In FIG. 5, an upper row shows the captured image, and a lower row shows the R interpolated image and reference G and B interpolated images for reference from the left.

The captured image is a night view of an urban area taken obliquely from above. In the captured image, a highway is placed on the left and right slightly below the center of the image, multiple tall buildings stand above the highway, light leaks from several windows of the tall building, and a general road is diagonally placed between the tall buildings. In the captured image, the highway and the general road are reddish, and the high-rise building is appeared in gray or ocher.

Further, by reflecting such colors of the captured image, the R interpolated image has a high signal intensity and a high SNR, and the G and B interpolated images (particularly, the B interpolated image) have a low signal intensity and a low SNR.

Figure 6:
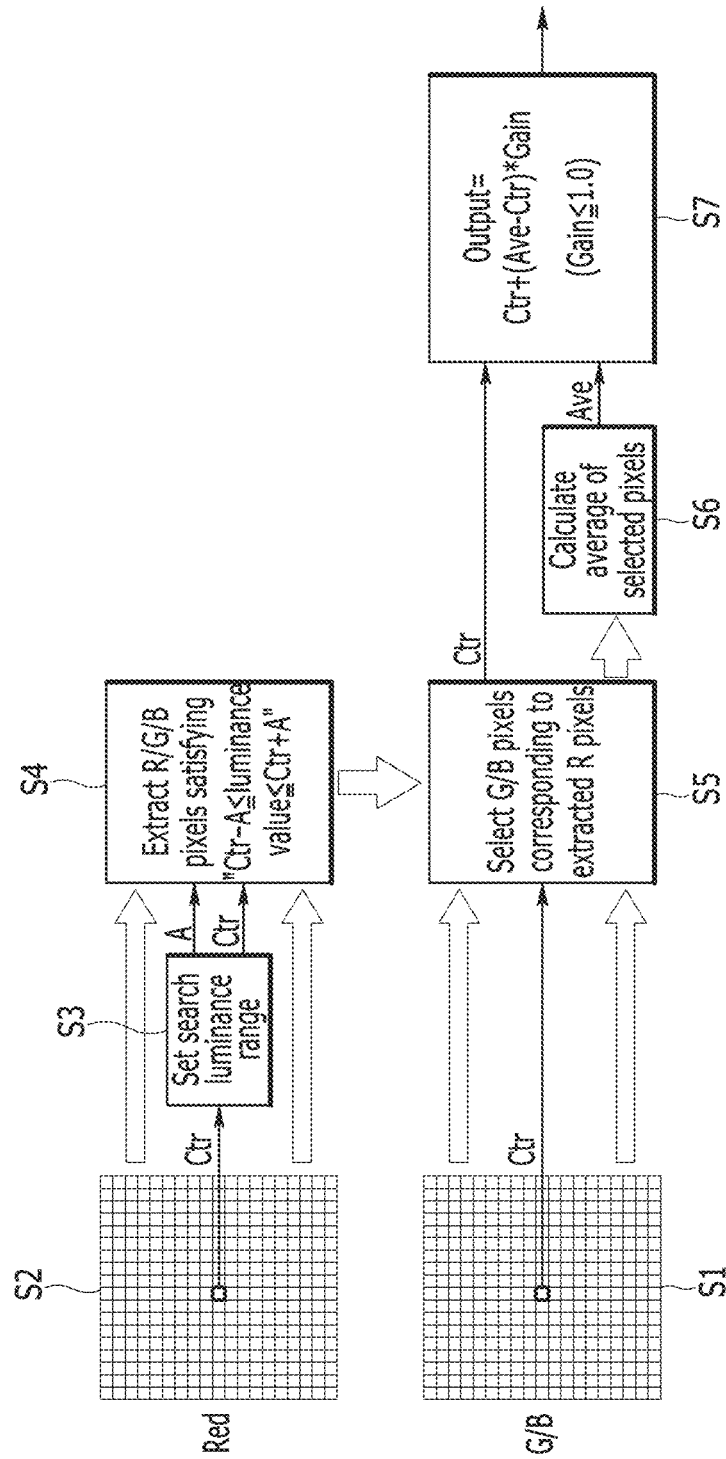
FIG. 6 is a diagram for explaining an image processing method according to a first example embodiment.

FIG. 6 is a diagram for explaining an image processing method according to the first embodiment.

Referring to FIGS. 3 and 6, in operation S30 of FIG. 3, which corresponds to operation S1 of FIG. 6, the image processing unit 14 selects a G pixel or a B pixel as a target pixel in the captured image. In the following, a case where the B pixel is selected as the target pixel is described, but the same processing is performed when the G pixel is selected as the target pixel.

Next, in operation S40 of FIG. 3, which corresponds to operation S2 of FIG. 6, the image processing unit 14 selects an R pixel in the R interpolated image corresponding to the B pixel. For example, referring to FIG. 4, when the B pixel P1 of the captured image is selected as the target pixel in step S30, the R pixel P2 of the R interpolated image is selected as the corresponding pixel in step S40.

Subsequently, in operation S50 of FIG. 3, which corresponds to operation S3 of FIG. 6, the image processing unit 14 sets a luminance range ±A determined by a magnitude of a luminance value Ctr of the R pixel selected in step S40.

Next, in operation S60 of FIG. 3, which corresponds to operation S4 of FIG. 6, the image processing unit 14 searches for and extracts R pixels in the R interpolated image whose luminance values falls within the range of the following equation 3 from peripheral pixels of the R pixel selected in step S40.

$$Ctr - A \leq \text{Luminance value of peripheral } R \text{ pixel} \leq Ctr + A \qquad \text{Equation 3}$$

In operation S70 of FIG. 3, which corresponds to operation S5 of FIG. 6, the image processing unit 14 may select B pixels in the captured image corresponding to the R pixels extracted in step S60. In the captured image, the pixels corresponding to the R pixels extracted in step S60 may be R pixels or G pixels, but only the B pixels having the same color as the target pixel are selected.

Next, in operation S80 of FIG. 3, which corresponds to operation S6 of FIG. 6, the image processing unit 14 may calculate an average value Ave of luminance values of the B pixels selected in step S70 and calculate an output value Output based on the calculated average value Ave using the following equation 4. In operation S90 of FIG. 3, which corresponds to operation S7 of FIG. 6, the image processing unit 14 may replace the luminance value Ctr of the B pixel that is the target pixel with the output value Output so that the noise of the target pixel is removed.

$$\text{Output} = Ctr + (Ave - Ctr) \times Gain \qquad \text{Equation 4}$$

Here, Gain≤1.0

After the image processing unit 14 selects and corrects each of the B pixel and G pixel in the captured image as the target pixel, and removes the noise, in operation S100, an image display unit 15 displays the captured image from which the noise has been removed, and an image storage unit 16 records the captured image from which the noise has been removed.

FIG. 7 is an example of a noise-removed image according to the first example embodiment and the comparative example. FIG. 7 shows that the noise has been removed from the captured image shown in FIG. 5, a left figure shows the noise-removed image according to the comparative example, and a right figure shows the noise-removed image according to the first example embodiment.

When the noise-removed image according to the comparative example and the noise-removed image according to the first embodiment are compared, edges of a window (frame) of each tall building, lighting fixtures on the right side of the image and vehicles on the road are clearer in the noise-removed image according to the first example embodiment. Therefore, an image excellent in color reproducibility and color resolution can be acquired by appropriately removing the noise in accordance with the image processing apparatus and the image processing method according to the first example embodiment.

Various modifications can be made in the image processing apparatus or the image processing method according to the first example embodiment. For example, although removing the noise from the R pixels having the high SNR in the captured image is not particularly described in the first example embodiment, the noise may not be removed from the R pixels, or the noise may be removed by using the method described in the comparative example or a well-known method.

Further, although only the R interpolated image in which all pixels are R pixels is generated at step S20 in the first example embodiment, a G or B interpolated image in which all pixels are G pixels or B pixels may be also generated. In this case, when the B pixels (or G pixels) corresponding to the R pixels extracted in step S60 are selected in step S70, the corresponding B pixels (or G pixels) always exist so that the average value Ave can be calculated by using more B pixels (or G pixels) in step S80.

Furthermore, in the first example embodiment, the G and B pixels are corrected based on the R pixels assuming an image in which the red color is dominant in the dark or in the dark part. However, in an image, such as an image in which the subject is a daytime sky, in which the blue color is dominant, the R and G pixels with the high SNR may be corrected based on the B pixels with the high SNR. In an image, such as an image in which the subject is a daytime forest, in which the green color is dominant, the R and B pixels with the low SNR may be corrected based on the G pixels with the high SNR. That is, the pixels having the low SNR may be corrected based on the pixels having the high SNR.

In addition, in the first example embodiment, the B pixels corresponding to the extracted R pixels are selected in step S70, the average value Ave of the luminance values of the selected B pixels is calculated in step S80, the output value Output is calculated by using Equation 4, and the luminance value Ctr of the target pixel B pixel is replaced with the output value Output so that the noise of the target pixel is removed. However, the method of removing the noise of the B pixel that is the target pixel by using the B pixels selected in step S70 is not limited thereto.

Further, in the first example embodiment, the imaging apparatus 1 is not limited to a digital camera, and may be various information processing devices including an imaging element, such as a smartphone.

Furthermore, in the first example embodiment, the image processing apparatus functions as the imaging apparatus, in particular, the image processing unit 14 to remove the noise from the captured image. However, the image processing apparatus may be provided separately from the imaging apparatus and remove the noise from the captured image output by the imaging apparatus. For example, the image processing apparatus may be a monitoring system that removes the noise from the captured image output by a monitoring camera.

As described above, the image processing apparatus 1 according to the first example embodiment includes an image processing unit 14 that inputs, from an imaging element 12 in which first imaging pixels having a low SNR and second imaging pixels having a high SNR are arranged on the same layer, a first captured image by the first imaging pixels and a second captured image by the second imaging pixels when the first imaging pixels and the second imaging pixels perform imaging simultaneously, selects a target pixel from the first captured image, extracts pixels having luminance values, which are close to a luminance value of a pixel corresponding to the target pixel in an interpolated image of the second captured image, from the interpolated image, selects pixels corresponding to the extracted pixels from the first captured image, and corrects a luminance value of the target pixel based on luminance values of the selected pixels.

Accordingly, it is possible to acquire an image excellent in color reproducibility and color resolution by appropriately removing noise from a noisy image captured in the dark.

In the image processing apparatus 1 according to the first example embodiment, the first imaging pixels may perform the imaging in a green wavelength band or a blue wavelength band, and the second imaging pixels may perform the imaging in a red wavelength band.

Accordingly, G and B pixels having the low SNR can be corrected based on the R pixels having the high SNR in the dark.

In the image processing apparatus 1 according to the first example embodiment, the image processing unit 14 may further select pixels corresponding to the extracted pixels from an interpolated image of the first captured image.

Accordingly, the pixels corresponding to the extracted pixels can be selected from the first captured image and the interpolated image of the first captured image to correct the G and B pixels.

In addition, the imaging apparatus 1 according to the first example embodiment may include the imaging element 12 and the image processing unit 14.

Further, the image processing method according to the first embodiment includes inputting, from an imaging element 12 in which first imaging pixels having a low SNR and second imaging pixels having a high SNR are arranged on the same layer, a first captured image by the first imaging pixels and a second captured image by the second imaging pixels when the first imaging pixels and the second imaging pixels perform imaging simultaneously (S10), selecting a target pixel from the first captured image (S30), extracts pixels having luminance values, which are close to a luminance value of a pixel corresponding to the target pixel in the second captured image or a pixel corresponding to the target pixel in an interpolated image of the second captured image, from the interpolated image (S60), selecting pixels corresponding to the extracted pixels from the first captured image (S70), and correcting a luminance value of the target pixel based on luminance values of the selected pixels (S90).

Accordingly, it is possible to acquire an image excellent in color reproducibility and color resolution by appropriately removing noise from a noisy image captured in the dark.

Second Embodiment

The image processing apparatus and the image processing method according to the first example embodiment remove the noise from the image captured by the imaging element 12 in which RGB imaging pixels are arranged on the same layer. An image processing apparatus and an image processing method according to a second example embodiment remove noise from an image captured by an imaging element in which RGB imaging pixels are stacked. In this case, the second example embodiment selects a G pixel or B pixel having a low SNR in the dark or in a dark part as a target pixel, extracts peripheral R pixels based on a luminance value of an R pixel corresponding to the target pixel and having a high SNR in the dark or in the dark part, selects G pixels or B pixels corresponding to the extracted R pixels, and corrects the target pixel based on luminance values of the selected G pixels or B pixels, like the first example embodiment.

Hereinafter, the image processing apparatus and the image processing method according to the second example embodiment is described with reference to the drawings.

The image processing apparatus according to the second example embodiment is an imaging apparatus, and particularly functions as an image processing unit and removes the noise from the captured image. A schematic configuration of the imaging apparatus may be the same as that according to the first example embodiment shown in FIG. 2, and illustration and description thereof are omitted herein.

Figure 8:
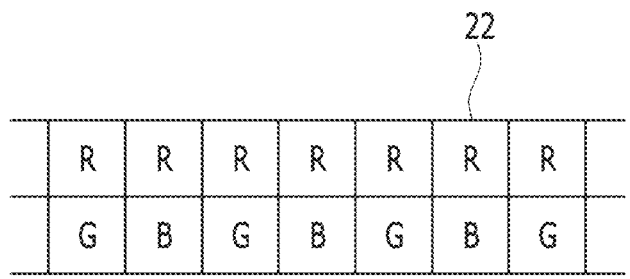
FIG. 8 is a diagram for explaining a schematic configuration of an imaging element according to a second example embodiment.

FIG. 8 is a diagram for explaining a schematic configuration of an imaging element 22 according to the second example embodiment. FIG. 8 shows a cross section when an imaging element 22 is viewed from a direction perpendicular to a stacking direction of imaging pixels.

The imaging element 22 has a stacked structure using a well-known technique, for example, in which a lower layer is formed of a semiconductor material such as a silicon substrate and an upper layer is formed of a semiconductor material or an organic film. In the lower layer, imaging pixels having the low SNR in an image to be captured, i.e., G imaging pixels and B imaging pixels are arranged in a checkered pattern. In the upper layer, R imaging pixels having the high SNR are arranged on an entire surface so as to correspond to the G imaging pixels or B imaging pixels in the lower layer. That is, in the upper layer, all the imaging pixels are the R imaging pixels.

In a captured image captured by such an imaging element 22, in order to obtain an R pixel having the high SNR and a G pixel or B pixel having the low SNR at the same position (coordinates) of the image and remove noise, the same processing as the image processing method according to the first example embodiment may be performed. In this case, since R pixels of all the pixels are obtained, the image processing unit 14 according to the second example embodiment may not generate an R interpolated image in operation S20.

That is, the image processing unit 14 according to the second example embodiment selects a B pixel (or G pixel) as a target pixel, selects an R pixel corresponding to the target pixel, extracts R pixels having luminance values close to a luminance value of the selected R pixel from peripheral pixels, selects B pixels (or G pixels) corresponding to the extracted R pixels, calculates an average value Ave of luminance values of the selected B pixels (or G pixels) and an output value Output, and replaces a luminance value of the target pixel with the output value Output so that the noise can be removed.

As described above, the image processing apparatus and the image processing method according to the second example embodiment can acquiring an image excellent in color reproducibility and color resolution by appropriately removing the noise similarly to those according to the first embodiment.

Various modifications can be made in the image processing apparatus or the image processing method according to the first embodiment. For example, although the imaging element 22 is formed of two layers of imaging pixels in the second embodiment, the imaging element 22 may be formed of three or more layers of imaging pixels.

Further, when the subject is a daytime sky, the B pixels may be used to correct the target pixels, i.e., the R or G pixels. When the subject is a daytime forest, the G pixels may be used to correct the target pixels, i.e., the R or B pixels.

As described above, the image processing apparatus according to the second example embodiment includes an image processing unit 14 that inputs, from an imaging element 22 in which first imaging pixels having a low SNR and second imaging pixels having a high SNR are stacked, a first captured image by the first imaging pixels and a second captured image by the second imaging pixels when the first imaging pixels and the second imaging pixels perform imaging simultaneously, selects a target pixel from the first captured image, extracts pixels having luminance values, which are close to a luminance value of a pixel corresponding to the target pixel in an interpolated image of the second captured image, from the interpolated image, selects pixels corresponding to the extracted pixels from the first captured image, and corrects a luminance value of the target pixel based on luminance values of the selected pixels.

Accordingly, it is possible to acquire an image excellent in color reproducibility and color resolution by appropriately removing noise from a noisy image captured in the dark.

Further, in the image processing apparatus according to the second example embodiment, in the imaging element 22, the second imaging pixels may be in an upper layer than the first imaging pixels.

Accordingly, it is possible to maintain the SNR of the second imaging pixels having the high SNR.

Third Embodiment

The image processing apparatus and the image processing method according to the first and second example embodiments remove the noise from the RGB image captured by the imaging element having the RGB imaging pixels. However, an image processing apparatus and an image processing method according to the third example embodiment remove noise from an RGB image by using an imaging element that further includes a near-infrared (NIR) imaging pixels having a SNR that is higher than that of the RGB imaging pixels in the dark or in a dark part.

First, a reason for using the NIR imaging pixels in the image processing apparatus and the image processing method according to the third example embodiment is briefly described.

Figure 9:
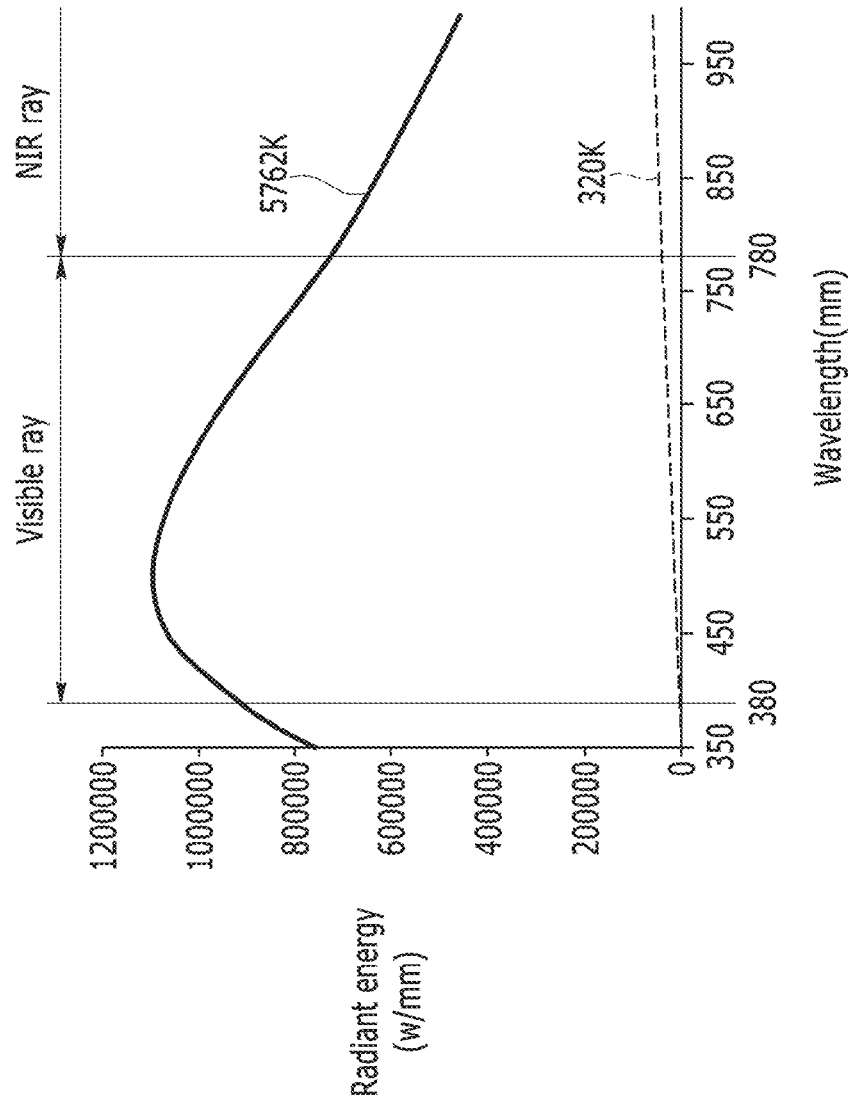
FIG. 9 is a diagram showing a relationship between a color temperature, a wavelength and a radiant energy.

FIG. 9 is a diagram showing a relationship between a color temperature, a wavelength and a radiant energy. In FIG. 9, the horizontal axis represents the wavelength (nm), the vertical axis represents the radiant energy (W/nm), the solid line represents a sunlight radiation spectrum (color temperature: 5762K), and the broken line represents a night view radiation spectrum (color temperature: 3200K).

The radiant energy is large at each wavelength in sunlight with the high color temperature, but small at each wavelength in a night scene with the low color temperature, and barely has its peak in the near-infrared ray. Therefore, in the dark, imaging is performed in the near-infrared wavelength band in addition to the visible light wavelength band so that NIR pixels having the higher SNR than that in the visible light wavelength band can be obtained.

FIG. 10 is a diagram for schematically explaining the image processing method according to the third example embodiment. In FIG. 10, a left figure shows the image processing method according to the first and second example embodiments, and a right figure shows the image processing method according to the third embodiment. In the first and second embodiments, an R signal having the high SNR in the dark or in the dark part is used to remove noise from G and B signals having the low SNR in the dark or in the dark part. However, in the third embodiment, an NIR signal having the SNR that is higher than that of the R signal in the dark or in the dark part is used to remove the noise from the R, G, and B signals.

Hereinafter, the image processing apparatus and the image processing method according to the third example embodiment are described with reference to the drawings.

The image processing apparatus according to the third embodiment is an imaging apparatus, and particularly functions as an image processing unit and removes the noise from the captured image. The schematic configuration of the imaging apparatus may be the same as that according to the first example embodiment shown in FIG. 2, and illustration and description thereof are omitted herein.

Figure 11:
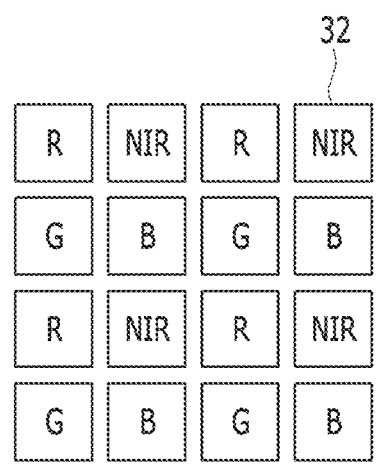
FIG. 11 is a diagram for explaining a schematic configuration of an imaging element according to a third example embodiment.

FIG. 11 is a diagram for explaining a schematic configuration of an imaging element 32 according to the third example embodiment. FIG. 11 shows an enlarged view of a part of an imaging surface in the imaging element 32.

In the imaging element 32, odd-numbered or even-numbered G imaging pixels in the Bayer array are replaced with NIR imaging pixels, and the NIR imaging pixels and RGB imaging pixels are arranged on the same layer. The NIR imaging pixel is, for example, an imaging pixel including a photoelectric conversion unit that performs imaging in a near-infrared wavelength band of 800 to 900 nm.

Figure 12:
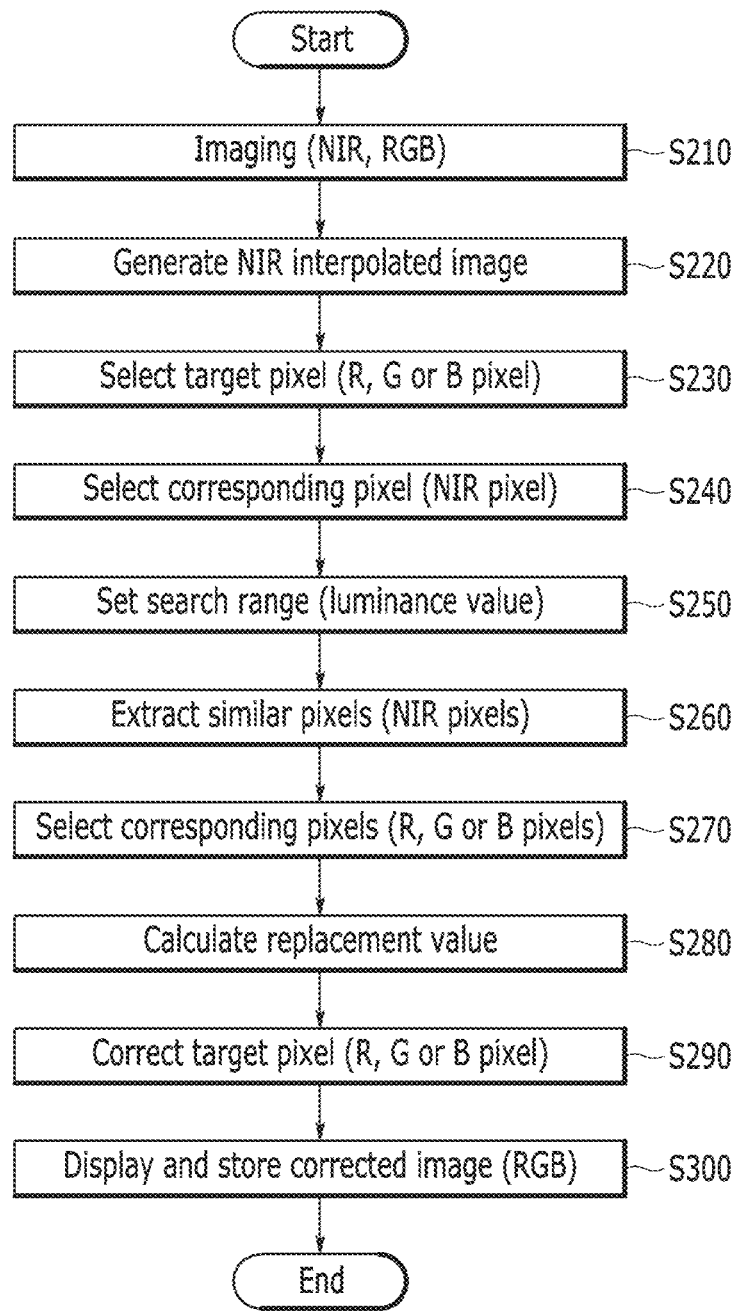
FIG. 12 is a flowchart showing an image processing method according to a third example embodiment.
Figure 13:
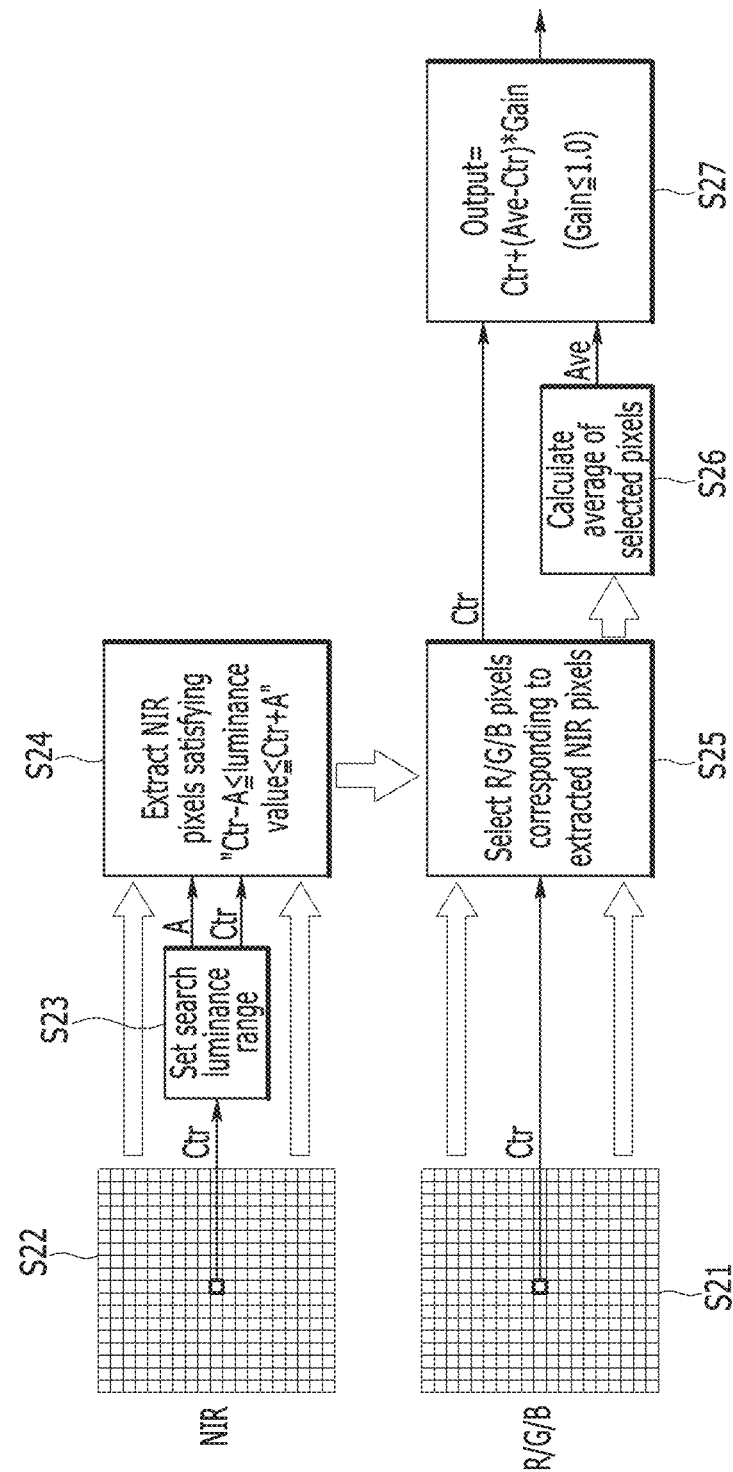
FIG. 13 is a diagram for explaining an image processing method according to a third example embodiment.

FIG. 12 is a flowchart showing an image processing method according to the third example embodiment, and FIG. 13 is a diagram for explaining an image processing method according to the third embodiment.

Referring to FIGS. 12 and 13, in the image processing method according to the third embodiment, in operation S210 when the shutter of the imaging apparatus 1 is pressed, the NIR imaging pixels and RGB imaging pixels arranged on the same layer of the imaging element 32 perform imaging simultaneously. In operation S220, the image processing unit 14 generates an NIR interpolated image using NIR pixels in a captured image.

Next, in operation S230 of FIG. 12, which corresponds to operation S21 of FIG. 13, the image processing unit 14 selects an R, G, or B pixel as a target pixel from the captured image, and in operation S240, which corresponds to operation S22 of FIG. 13, selects an NIR pixel from the NIR interpolated image as the corresponding pixel. In operation S250, which corresponds to operation S23 of FIG. 13, the image processing unit 14 sets a search luminance range. In operation S260, which corresponds to operation S24 of FIG. 13, the image processing unit 14 extracts peripheral NIR pixels having luminance values close to a luminance value of the corresponding pixel from the NIR interpolated image.

Next, in operation S270, which corresponds to operation S25 of FIG. 13, the image processing unit 14 selects R, G, or B pixels from the captured image as corresponding pixels of the extracted NIR pixels. Thereafter, in operations S280 and S290, which correspond to operations S26 and 27 of FIG. 13, respectively, the image processing unit 14 calculates a replacement value and corrects the target pixel to remove. In operation S300, the noise and the corrected image is displayed and stored.

As described above, the image processing apparatus and the image processing method according to the third example embodiment can acquiring an image excellent in color reproducibility and color resolution by appropriately removing the noise similarly to those according to the first and second example embodiments.

Modification of Third Embodiment

Various modifications can be made in the image processing apparatus or the image processing method according to the second example embodiment. For example, although the NIR imaging pixels and the RGB imaging pixels are arranged on the same layer as the imaging element 32 in the third example embodiment, the NIR imaging pixels and the RGB imaging pixels may be stacked in the imaging element.

FIG. 14 is a diagram for explaining a schematic configuration of an imaging element 42 according to a modification of the third example embodiment. FIG. 14 shows a cross section when a pixel row (or pixel column) of the imaging element 42 and a pixel row (or pixel column) adjacent thereto are viewed from a direction perpendicular to a stacking direction of the imaging element 42.

The imaging element 42 has a stacked structure using a well-known technique, for example, in which a lower layer is formed of a semiconductor material such as a silicon substrate and an upper layer is formed of a semiconductor material or an organic film. In the lower layer, R, G and B imaging pixels having the low SNR in the dark or in the dark part are arranged in the Bayer array. In the upper layer, the NIR imaging pixels having the high SNR in the dark or in the dark part are arranged on an entire surface so as to correspond to the R, G and B imaging pixels. That is, in the upper layer, all the imaging pixels are the NIR imaging pixels.

In a captured image captured by such an imaging sensor 42, in order to obtain an NIR pixel having the low SNR and an R, G or B pixel having the high SNR and at the same position (coordinates) of the image and remove noise of the R, G or B pixel, the same processing as the image processing method according to the first embodiment may be performed. In this case, since the NIR pixels of all the pixels are obtained, the modification of the third embodiment may not generate an NIR interpolated image.

Although the imaging element 42 is formed of two layers of imaging pixels in the modification of the third embodiment, the imaging element 42 may be formed of three or more layers of imaging pixels. Further, the imaging pixels having the high SNR may not be in an upper layer.

As described above, in the image processing apparatus according to the third example embodiment, the first imaging pixels may perform the imaging in a red wavelength band, a green wavelength band, or a blue wavelength band, and the second imaging pixels may perform the imaging in a near-infrared wavelength band.

Accordingly, it is possible to correct the RGB pixels and remove the noise using the NIR pixels having the high SNR.

In some example embodiments, the image processing unit 14 may sense a luminance of a scene and selectively switch between operating a first mode in which the image processing apparatus 14 performs the image processing method of FIG. 1 and a second mode in which the image processing apparatus performs the image processing methods of one of the first to third example embodiments based on the sensed luminance. For example, in the first mode, the image processing unit 14 may search for pixels having the same color as the target pixel, and calculate the average value of these pixels having the same color as the target pixel, and, in the second mode, the image processing unit 14 may select G pixel or B pixel having a low SNR in the dark or in a dark part as a target pixel, extract peripheral R pixels based on a luminance value of an R pixel corresponding to the target pixel and having a high SNR in the dark or in the dark part, select G pixels or B pixels corresponding to the extracted R pixels, and correct the target pixel based on luminance values of the selected G pixels or B pixels.

While example embodiments have been described in connection with reference to some example embodiments, it is to be understood that the example embodiments is not limited to the disclosed example embodiments. On the contrary, it is intended to cover various modifications and equivalent arrangements included within the spirit and scope of the appended claims.

What is claimed is:

1. An image processing apparatus comprising:
   processing circuitry configured to,
     receive a first captured image and a second captured image simultaneously captured via first imaging pixels and second imaging pixels, respectively, that are one of stacked or are arranged on a same layer of an imaging element, the second imaging pixels having a higher signal-to-noise ratio (SNR) than the first imaging pixels,
     select a target pixel from the first captured image, the target pixel in the first captured image having a corresponding pixel in the second captured image or an interpolated image of the second captured image,
     extract pixels from the second captured image or the interpolated image of the second captured image based on a luminance value of the corresponding pixel to generate extracted pixels,
     select pixels corresponding to the extracted pixels from the first captured image as selected pixels, and
     correct a luminance value of the target pixel based on luminance values of the selected pixels.

2. The image processing apparatus of claim 1, wherein the processing circuitry is configured to generate the extracted pixels such that luminance values of the extracted pixels fall within a set luminance range of the luminance value of the corresponding pixel.

3. The image processing apparatus of claim 2, wherein the set luminance range is based on a magnitude of the luminance value of the corresponding pixel.

4. The image processing apparatus of claim 1, wherein the processing circuitry is configured to generate the extracted pixels by,
extracting the pixels from a set number of pixels in a vertical direction and a horizontal direction around the corresponding pixel, based on the luminance value of the corresponding pixel.

5. The image processing apparatus of claim 1, wherein the processing circuitry is configured to calculate an average value of the luminance values of the selected pixels, and
correct the luminance value of the target pixel by a value determined based on the luminance value of the target pixel, the average value, and a set gain.

6. The image processing apparatus of claim 1, wherein
the first imaging pixels are configured to perform imaging in a red wavelength band, a green wavelength band, or a blue wavelength band, and
the second imaging pixels are configured to perform imaging in a near-infrared wavelength band.

7. The image processing apparatus of claim 1, wherein
the first imaging pixels are configured to perform imaging in a green wavelength band or a blue wavelength band, and
the second imaging pixels are configured to perform imaging in a red wavelength band.

8. The image processing apparatus of claim 1, wherein the second imaging pixels are in an upper layer of the imaging element as compared to the first imaging pixels.

9. The image processing apparatus of claim 1, wherein the processing circuitry is further configured to select pixels corresponding to the extracted pixels from an interpolated image of the first captured image.

10. An image processing apparatus comprising:
processing circuitry configured to,
receive a first captured image and a second captured image simultaneously captured via first imaging pixels and second imaging pixels, respectively, that are one of stacked or are arranged on a same layer of an imaging element, the second imaging pixels having a higher signal-to-noise ratio (SNR) than the first imaging pixels,
select a target pixel from the first captured image, the target pixel in the first captured image having a corresponding pixel in the second captured image or an interpolated image of the second captured image,
select, as selected pixels, pixels from the first captured image based on a luminance value of the corresponding pixel in the second captured image or the interpolated image, and
correct a luminance value of the target pixel based on luminance values of the selected pixels.

11. The image processing apparatus of claim 10, wherein the processing circuitry is configured to select the selected pixels such that luminance values of pixels corresponding to the selected pixels in the second captured image or the interpolated image fall within a set luminance range of the luminance value of the corresponding pixel.

12. The image processing apparatus of claim 11, wherein the set luminance range is based on a magnitude of the luminance value of the corresponding pixel.

13. The image processing apparatus of claim 10, wherein the processing circuitry is configured to extract the pixels corresponding to the selected pixels by,
extracting the pixels from a set number of pixels in a vertical direction and a horizontal direction around the corresponding pixel, based on the luminance value of the corresponding pixel.

14. The image processing apparatus of claim 10, wherein the processing circuitry is configured to calculate an average value of the luminance values of the selected pixels, and
correct the luminance value of the target pixel by a value determined based on the luminance value of the target pixel, the average value, and a set gain.

15. The image processing apparatus of claim 10, wherein
the first imaging pixels are configured to perform imaging in a red wavelength band, a green wavelength band, or a blue wavelength band, and
the second imaging pixels are configured to perform imaging in a near-infrared wavelength band.

16. The image processing apparatus of claim 10, wherein
the first imaging pixels are configured to perform imaging in a green wavelength band or a blue wavelength band, and
the second imaging pixels are configured to perform imaging in a red wavelength band.

17. The image processing apparatus of claim 10, wherein the second imaging pixels are in an upper layer of the imaging element as compared to the first imaging pixels.

18. The image processing apparatus of claim 10, wherein the processing circuitry is further configured to select pixels from an interpolated image of the first captured image based on the luminance value of the corresponding pixel.

19. A non-transitory computer readable medium storing image processing program that, when executed by a computing device, configures the computing device to:
receive a first captured image and a second captured image by simultaneously captured via first imaging pixels and second imaging pixels, respectively, that are one of stacked or are arranged on a same layer of an imaging element, the second imaging pixels having a higher signal-to-noise ratio (SNR) than the first imaging pixels;
select a target pixel from the first captured image, the target pixel in the first captured image having a corresponding pixel corresponding thereto in the second captured image or an interpolated image of the second captured image;
select, as selected pixels, pixels from the first captured image based on a luminance value of the corresponding pixel in the second captured image or the interpolated image; and
correct a luminance value of the target pixel based on luminance values of the selected pixels.

20. The non-transitory computer readable medium of claim 19, wherein the selecting pixels includes:
extracting pixels from the second captured image or the interpolated image of the second captured image based on the luminance value of the corresponding pixel to generate extracted pixels; and
selecting the selected pixels corresponding to the extracted pixels from the first captured image.

* * * * *